(12) United States Patent
Lee et al.

(10) Patent No.: US 8,671,452 B2
(45) Date of Patent: Mar. 11, 2014

(54) APPARATUS AND METHOD FOR MOVING RIGHTS OBJECT FROM ONE DEVICE TO ANOTHER DEVICE VIA SERVER

(75) Inventors: Seung-Jae Lee, Seoul (KR); Te-Hyun Kim, Gyeonggi-Do (KR); Youn-Sung Chu, Seoul (KR); Sung-Mu Son, Gyeonggi-do (KR); Kiran Kumar Keshavamurthy, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1765 days.

(21) Appl. No.: 11/657,481

(22) Filed: Jan. 25, 2007

(65) Prior Publication Data

US 2007/0172065 A1 Jul. 26, 2007

Related U.S. Application Data

(60) Provisional application No. 60/787,232, filed on Mar. 30, 2006, provisional application No. 60/833,493, filed on Jul. 27, 2006.

(30) Foreign Application Priority Data

Jan. 26, 2006 (KR) .................. 10-2006-0008575
Aug. 25, 2006 (KR) .................. 10-2006-0081343

(51) Int. Cl.
*G06F 21/00* (2013.01)

(52) U.S. Cl.
USPC .......................................................... 726/26

(58) Field of Classification Search
USPC .......................................................... 726/26
See application file for complete search history.

(56) References Cited

U.S. PATENT DOCUMENTS

| 7,092,524 | B1* | 8/2006 | Timmel .................. 380/28 |
| 7,096,268 | B1 | 8/2006 | Shoda et al. |
| 2004/0168073 | A1 | 8/2004 | Bourne et al. |
| 2004/0199471 | A1 | 10/2004 | Hardjono |
| 2005/0008163 | A1* | 1/2005 | Leser et al. ............ 380/281 |
| 2005/0008463 | A1 | 1/2005 | Stehr et al. |

(Continued)

FOREIGN PATENT DOCUMENTS

| GB | 2415525 A | 12/2005 |
| JP | 10-149283 A | 6/1998 |

(Continued)

OTHER PUBLICATIONS

DRM Specification V2.0. Draft Version 2.0—Apr. 20, 2004. Open Mobile Alliance. http://xml.coverpages.org/OMADRMv204-20040420.pdf.*

(Continued)

*Primary Examiner* — Tamara T Kyle
(74) *Attorney, Agent, or Firm* — Birch, Stewart, Kolasch & Birch, LLP

(57) ABSTRACT

An apparatus and method for transferring a Rights Object (RO) for a content between devices via a server, wherein a sending device converts a first RO taken by itself to encode into a second RO, and sends an RO move request message including the second RO to the server, whereas the server converts the second RO included in the RO move request message into a third RO and transfers the third RO to a receiving device, whereby the receiving device receives the third RO from the server for installation, wherein the sending device deletes or modifies the first RO at an appropriate time point.

30 Claims, 9 Drawing Sheets

(56) References Cited

U.S. PATENT DOCUMENTS

| | | | |
|---|---|---|---|
| 2005/0028006 A1* | 2/2005 | Leser et al. | 713/200 |
| 2005/0268098 A1 | 12/2005 | Oh et al. | |
| 2005/0268344 A1 | 12/2005 | Matsukawa et al. | |
| 2007/0098179 A1* | 5/2007 | Nave | 380/286 |
| 2007/0121942 A1* | 5/2007 | Watanabe et al. | 380/232 |
| 2007/0165859 A1* | 7/2007 | Scheidt et al. | 380/255 |

FOREIGN PATENT DOCUMENTS

| | | |
|---|---|---|
| KR | 10-2005-0020165 A | 3/2005 |
| KR | 10-2005-0111534 A | 11/2005 |
| RU | 2249245 C2 | 3/2005 |
| RU | 2331917 C2 | 8/2008 |

OTHER PUBLICATIONS

James Irwin. Digital Rights Management: The Open Mobile Alliance DRM Specifications. Jan. 26, 2005. Information Security Technical Report. vol. 9, No. 4. pp. 22-31.*

Bruce Schneier, Applied Cryptography, Second Edition: Protocols, Algorithms, and Source Code in C (cloth), Chapter 1: Foundations. John Wiley and Sons, Inc., Jan. 1, 1996.

* cited by examiner

FIG. 3

```xml
<complexType name="ROMoveTrigger">
  <sequence>
    <element name="riID" type="roap:Identifier"/>
    <element name="riAlias" type="string" minOccurs="0"/>
    <element name="nonce" type="roap:Nonce" minOccurs="0"/>
    <element name="roID" type="roap:Identifier" minOccurs="0" maxOccurs="unbounded"/>
    <element name="roapURL" type="anyURI"/>
<element name="targetDeviceID" type="roap:Identifier" minOccurs="0"/>
<attribute name="id" type="ID"/>
<attribute name="ROrequested" type="boolean" default="true" />
</complexType>
<!-- ROAP trigger -->
<element name="roapTrigger" type="roap:RoapTrigger"/>
<complexType name="RoapTrigger">
  <annotation>
    <documentation xml:lang="en">
      Message used to trigger the device to initiate a Rights Object Acquisition Protocol.
    </documentation>
  </annotation>
  <sequence>
    <choice>
      <element name="registrationRequest" type="roap:RegistrationRequestTrigger"/>
      <element name="roAcquisition" type="roap:ROAcquisitionTrigger"/>
      <element name="joinDomain" type="roap:DomainTrigger"/>
      <element name="leaveDomain" type="roap:DomainTrigger"/>
      <element name="roMove" type="roap:ROMoveTrigger"/>
    </choice>
    <element name="signature" type="ds:SignatureType" minOccurs="0"/>
    <element name="encKey" type="xenc:EncryptedKeyType" minOccurs="0"/>
  </sequence>
  <attribute name="version" type="roap:Version"/>
  <attribute name="proxy" type="boolean"/>
</complexType>
```

FIG. 4

| Parameter | ROAP-RO Move Request |
|---|---|
| Device ID | M |
| RI ID | M |
| Trigger Nonce | O |
| Device Nonce | M |
| Request Time | M |
| Target Device ID | O |
| ROInfo | M |
| Certificate Chain | O |
| Extensions | O |
| Signature | M |

FIG. 5

```xml
<!--ROMoveRequest -->
<element name="roMoveRequest" type="roap:ROMoveRequest" />
<complexType name="ROMoveRequest">
 <annotation>
  <documentation xml:lang="en">
   Message sent from Device to RI to request submit RO.
  </documentation>
 </annotation>
 <complexContent>
  <extension base="roap:Request">
   <sequence>
    <element name="deviceID" type="roap:Identifier" />
    <element name="riID" type="roap:Identifier" />
    <element name="nonce" type="roap:Nonce" />
    <element name="targetDeviceID" type="roap:Identifier" />
    <element name="ROInfo" maxOccurs="unbounded">
     <complexType>
      <sequence>
       <choice>
        <sequence>
         <element name="protectedRO" type="roap:ProtectedRO" form="qualified" />
         <element name="StateInformationObject" type="o-ex:constraintType"
          minOccurs="0" maxOccurs="unbounded" />
        </sequence>
        <sequence>
         <element name="roID" type="ID" />
         <element name="signature" type="ds:SignatureType" />
         <element name="StateInformationObject" type="o-ex:constraintType"
          minOccurs="0" maxOccurs="unbounded" />
        </sequence>
       </choice>
      </sequence>
     </complexType>
    </element>
    <element name="certificateChain" type="roap:CertificateChain" minOccurs="0" />
    <element name="extensions" type="roap:Extensions" minOccurs="0" />
    <element name="signature" type="base64Binary" />
   </sequence>
  </extension>
 </complexContent>
</complexType>
```

FIG. 6

```
<!-- Used in ROAP-ROMoveRequest message -->
<complexType name="RedirectIdentifier">
 <complexContent>
   <extension base="roap:Extension"/>
     <sequence minOccurs="0">
       <element name="id" type="string"/>
            <minLength value="12"/>
     </sequence>
   </extension>
 </complexContent>
</complexType>
```

FIG. 7

| Parameter | ROAP-ROMoveResponse | |
|---|---|---|
| | Status = Success | Status ≠ Success |
| Status | M | M |
| Device ID | M | - |
| RI ID | M | - |
| RI Nonce | M | - |
| ROURI | O | - |
| Extensions | O | - |
| Signature | M | - |

FIG. 8

```xml
<!--ROMoveResponse -->
<element name="roMoveResponse" type="roap:ROMoveResponse"/>
<complexType name="ROMoveResponse">
<annotation>
    <documentation xml:lang="en">
    Message sent from RI to Device in response to a ROSubmit.
    </documentation>
</annotation>
<complexContent>
  <extension base="roap:Response">
    <sequence minOccurs="0">
      <element name="deviceID" type="roap:Identifier"/>
      <element name="riID" type="roap:Identifier"/>
      <element name="nonce" type="roap:Nonce" minOccurs="0"/>
      <element name="signature" type="base64Binary"/>
      <element name="extensions" type="roap:Extensions"/>
    </sequence>
  </extension>
</complexContent>
</complexType>
```

FIG. 9

```
<permission>
...
<move partial="true">
 <type>viaRI</type>
 <type>directly</type>
<constraint>
<count>5</count>
</constraint>
</move>
</permission>
```

APPARATUS AND METHOD FOR MOVING RIGHTS OBJECT FROM ONE DEVICE TO ANOTHER DEVICE VIA SERVER

BACKGROUND OF THE INVENTION

1. Field of the Invention

The present invention relates to an apparatus and method for transferring (or moving) a Rights Object (RO) between devices in a Digital Rights Management (DRM), and more particularly, to an apparatus and method for transferring an RO for a digital content from one device to another device via a server.

2. Description of the Related Art

Digital contents may be acquired through every available routes, for example, by being downloaded from a website of a Content Issuer (CI) or received by mail (e.g., e-mail) or any media from other equipment. In order to use the digital contents, a Rights Object (RO) should be issued by a Rights issuer (RI). A technology related to this is referred to as a Digital Rights Management (DRM).

A DRM agent is generally a software or program installed in a device which uses the contents. Instead of CIs and RO providers, the DRM agent prevents illegal use and piracy of digital contents, and protects their copyrights.

Two types of ROs include a stateful RO and a non-stateful RO. The stateful RO is limited by constraints such as the number of usage times or a used time. Here, when reproducing (playing) a corresponding digital content, it is necessary to inspect and record how many rights have been used, the recorded information being called state information. Therefore, the state information is generally updated simultaneously when playing digital contents.

Typically, in order to use a certain digital content in the DRM System, a device user should directly have an RO for the content issued by an RI. Many methods by which a device accesses an RI to acquire an RO issued by the RI have been introduced.

However, a detailed method by which an authenticated device transfers (e.g., delivers, moves, etc.) all or part of its own RO directly issued by an RI to another device has not been proposed yet.

SUMMARY OF THE INVENTION

Therefore, it is an object of the present invention to provide an apparatus and method for moving (transferring) all or part of a Rights Object (RO) of a particular device to another device via a server.

To achieve this object of the present invention, there is provided a method for transferring an RO between devices via a server comprising: converting, by a sending device, a first RO to generate a second RO; sending an RO move request message from the sending device to the server, to request the server to transfer (or move) the second RO to a receiving device via the server; receiving a response message from the server with respect to the RO move request message; and deleting the first RO or modifying state information on the first RO.

In another embodiment of the present invention, a method for transferring an RO between devices via a server comprising: receiving an RO move request message from a sending device; sending a response message to the sending device with respect to the RO move request message; converting a first RO included in the RO move request message into a second RO; and transferring the converted second RO to a receiving device.

To achieve this object of the present invention, there is provided a sending device for transferring an RO to a receiving device via a server may comprise: a Digital Rights Management (DRM) agent which encodes an RO to be moved to the receiving device via the server and sends an RO move request message including the encoded RO to the server; and a communication module which communicates with at least the server.

To achieve this object of the present invention, there is provided a server for transferring an RO between devices may comprise: a Rights issuer (RI) which receives from a sending device an RO move request message including an RO to be moved to a receiving device, sends a response message to the sending device with respect to the RO move request message, converts the RO included in the RO move request message, and transfers the converted RO to the receiving device; and a communication module Which communicates with at least the sending device and the receiving device.

To achieve this object of the present invention, there is provided a system for transferring an RO between devices via a server may comprise: a sending device which sends an RO move request message including a second RO converted from a first RO; a server which converts the second RO included in the RO move request message into a third RO and sends the converted third RO to a receiving device; and the receiving device which receives the third RO from the server and installs the third RO.

To achieve this object of the present invention, there is provided a method for transferring a rights object between devices via a server comprising: sending, by a sending device, a rights object move request message including a rights object identifier; checking, by the server, a rights object corresponding to the rights object identifier; receiving, by the sending device, a rights object move response message from the server; and deleting, by the sending device, the rights object corresponding to the rights object identifier or modifying state information related to the rights object.

The method for transferring the rights object between the devices via the server may further comprise: converting, by the server, the checked rights object into a rights object for a receiving device; and transferring, by the server, the converted rights object to the receiving device.

The converting of the rights object may comprise: decoding, by the server, the checked rights object using a public key of the server or a secret key previously shared with the sending device; and encoding the decoded rights object using a public key of the receiving device or a secret key previously shared with the receiving device.

BRIEF DESCRIPTION OF THE DRAWINGS

FIG. 3 illustrates an exemplary text describing a syntax of an RO move trigger in accordance with the present invention;

FIG. 4 illustrates parameters of an RO move request message in accordance with the present invention;

FIG. 5 illustrates am exemplary syntax of an RO move request message in accordance with the present invention;

FIG. 6 illustrates a schema fragment of a redirect identifier extension parameter included in an RO move request message in accordance with the present invention;

FIG. 7 illustrates a structure of an RO move request message in accordance with the present invention;

FIG. 8 illustrates an exemplary text indicating a syntax of an RO move request message in accordance with the present invention;

FIG. 9 illustrates an exemplary XML document indicating "move" permission included in an RO.

DETAILED DESCRIPTION OF THE INVENTION

The present invention is implemented such that a first device transfers or moves ('transfer' and 'move' are used as the same meaning hereafter) all or part of an RO taken by the first device to a second device via a server.

When all of the RO of the first device is transferred to the second device via the server, the first device can no longer use the RO and the second device can use the RO transferred thereto. When part of the RO of the first device is transferred to the second device via the server, on the other hand, the first device can use the remaining RO except for the part of the RO transferred and the second device can use the part of the RO transferred thereto.

The RO transferred from the first device to the second device via the server may be one of a device rights object and a user domain rights object.

If the server previously stores information related to the RO taken by the first device (e.g., when the server is an RI which initially issued the RO to the first device), the first device and the server can identify the RO each other based on an RO identifier. Here, the first device transfers an RO identifier and a state information object to the server, whereas the server encodes the RO corresponding to the received RO identifier and the state information object using a public key of the second device or a secret key previously shared with the second device, to thereafter transfer to the second device.

The first and second devices may belong to the same user or to different users from each other.

The server may constraint transfer of non-permitted RO. The server is a contents provider, which includes a Contents Issuer (CI) and a Rights Issuer (RI).

The second device may transfer the transferred RO to another device if the transferred RO has move permission.

The first device sends to the server an RO move request message which includes a second RO converted from a first RO taken by the first device itself. The server sends a response message to the first device with respect to the RO move request message. The server also converts the second RO included in the RO move request message into a third RO and then transfers the converted third RO to the second device.

In the present invention, the state information includes values each indicating a current state corresponding to an RO. Here, when the RO includes any one of stateful constraints (e.g., interval, count, timed-count accumulated, etc.), the state information indicates a value managed by a DRM agent. The state information object indicates an instance of format of state information for the purpose of transferring the state information from one device to another device.

Embodiments of the present invention will now be described with reference to the accompanying drawings.

Figure 1:
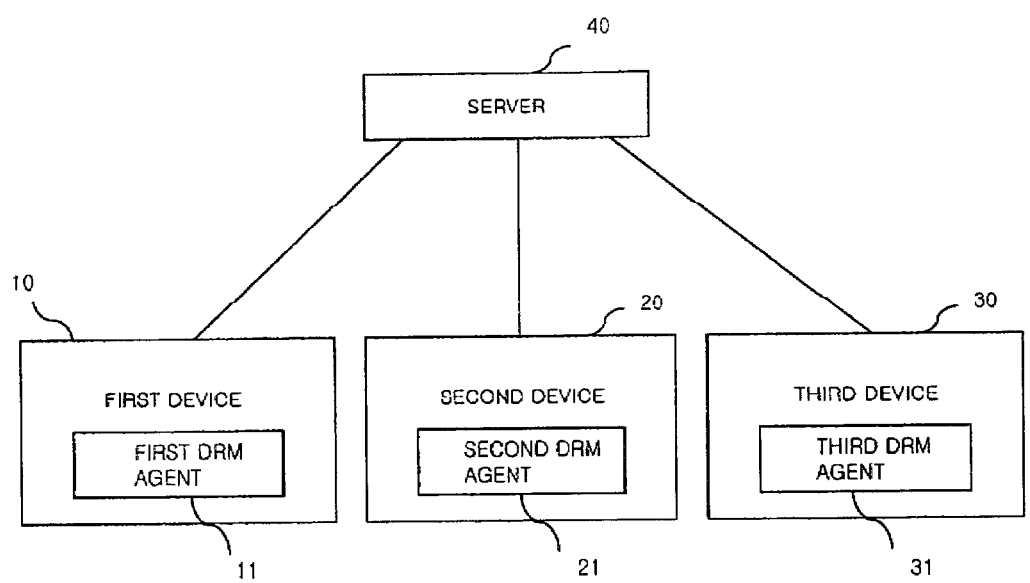
FIG. 1 illustrates an embodiment of a configuration of a system for moving a rights object among devices via a server in accordance with the present invention.

FIG. 1 illustrates an embodiment of a configuration of a system for moving a rights object among devices via a server in accordance with the present invention. As illustrated in FIG. 1, a system according to the present invention may include a first device 10 which sends an RO move request message which includes a second RO converted from a first RO, a server 40 which converts the second RO included in the RO move request message into a third RO and sends the converted third RO to a second device 20, and the second device 20 which receives the third RO from the server 40 for installation.

When receiving the RO move request message, the server 40 sends a response message to the first device with respect to the RO move request message.

The first device 10 has a first DRM agent 11 and the second device has a second DRM agent 21. The server 40 may be either a contents provider or an RI. The contents provider includes a Contents Issuer (CI) and a Rights Issuer (RI).

The first device 10 further comprises a communication module which communicates with at least the server and the second device 20 further comprises a communication module which communicates with at least the server. The server further comprises a communication module which communicates with at least the first and second devices 10 & 20.

The first RO denotes an RO issued to the first device 10 by the server 40.

The second RO denotes all or part of the first RO when moving (transferring) the first RO to the second device 20 via the server 40.

The second RO denotes an RO obtained by decoding, by the first device 10, the first RO using a private key of the first device 10 or a secret key shared with the server 40 (here, a Rights Encryption Key (REK) and a MAC key of the first RO are decoded), and then encoding the decoded first RO using a public key of the server 40 or a secret key shared with the server 40.

The second RO includes at least a rights encryption key (REK) encoded (or encrypted) by using the public key of the server 40 or a secret key shared with the server 40. The decoded MAC key within the first RO may be included in the second RO.

The second RO may have permissions, constraints, a digital signature value, a CEK, and a REK, all of which are the same as those of the first RO.

When the first RO is stateful, the first device 10 sends the second RO to the server 40 together with the state information object.

The second RO includes a Rights Encryption Key (REK) and a MAC key which are wrapped and encoded using the public key of the server 40 so that the server 40 can decode (or decipher) the REK and MAC key, and also includes a mac value calculated using the decoded MAC key in the first RO or a newly-generated MAC key, so as to allow the server 40 to verify the second RO.

The third RO denotes an RO obtained by decoding, by the server 40, the second RO using the private key of the server 40 or the secret key shared with the first device 10, and then encoding the decoded second RO using the public key of the second device 20 or a secret key shared with the second device 20.

The server 40 decodes a REK and a MAC key of the second RO using a public key of the server 40 or the secret key shared with the first device 10.

The server 40 encodes the REK of the second RO decoded by the server 40 using the public key of the second device 20 or the secret key shared with the second device 20. The server 40 then modifies a move (or transfer) count constraint value among constraints included in the second RO and generates a mac value using the decoded MAC key in the second RO or a newly-generated MAC key, so as to object the third RO.

If the first device 10 transfers both the second RO and the state information object, the server 40 converts the second RO into the third RO which is incorporated state of the second RO from the transferred state information object.

After the first device 10 converts all of the first RO into the second RO and then transfers the second RO to the server 40, when receiving a response message from the server 40 with respect to the RO move request message, the first device 10 deletes the first RO.

After the first device 10 converts part of the first RO into the second RO and then sends the converted second RO to the server 40, when receiving a response message from the server 40 with respect to the RO move request message, the first device 10 modifies (updates) the state information on the first RO.

In the present invention, first and second embodiments describe the transfer (or movement, etc.) all of RO via the server and the transfer (or movement, etc.) of part of the RO via the server, respectively.

First, a method for transferring an RO from one device to another device via a server is schematically described in accordance with the first embodiment herebelow. The first embodiment illustrates a transfer of all of the RO.

A first user of the first device 10 browses a specific content (e.g., an MP3 music file, a video file, etc.) from the server 40 (i.e., a contents provider, particularly a Rights Issuer (RI) 41) by using the first device 10 (e.g., one of mobile phones and mobile communications terminals) or other means like PC. Here, an RO generated for the specific content by the RI 41 may include move permission.

If the specific content is an MP3 file, the first user desires to give the MP3 file to a second user as a gift.

When the RO generated by the RI 41 for the MP3 file contains the move permission, the first user downloads both the MP3 file and the RO therefor.

Afterwards, in order to transfer (move) all of the RO which has not be used or partially used, the first user accesses the server 40 and transfers the RO for the MP3 file to the server 40.

The second device 20 (e.g., a portable MP3 player) of the second user connects to the server 40 of the first device 10 to download both the MP3 file and the RO transferred to the server 40 by the first user.

The second user can accordingly play the MP3 file using his second device 20, and the first user can not play the MP3 file any longer using the first device 10.

As such, the first device 10 can transfer (move) all of the RO taken by itself to the second device 20 via the server 40.

Hereinafter, a method for transferring part of RO from one device to another device via a server will schematically be described in accordance with the second embodiment of the present invention. The second embodiment illustrates a transfer of part of the RO.

The first user browses usable contents (i.e., videos) from the server 40 using the first device 10.

The first user selects a specific video with instructing that he desires to play the specific video ten times and share it.

The server 40 generates an RO for the selected video, the RO having a constraint of ten-time play constraint and move permission.

The first user then downloads both the video and the RO using the first device 10.

The first user plays the video once using the first device 10.

If the second device 20 desires to play the video certain number of times, the first user accesses the server 40 using the first device 10 and transfers part of the RO for the video to the server 40.

That is, if the second device 20 desires to play the video one time, the first device transfers to the server 40 an RO for an one-time play from all of the RO taken by itself.

The second user accesses the server 40 via the second device 20, and then downloads the video and the RO transferred from the first device 10 to the server 40 (here, the second user may be the same user as the first user or a different user).

The second user can accordingly play the video based on the RO for the one-time play obtained via the second device 20.

In the meantime, the first device 10 then has the RO for playing the video eight times.

Hereinafter, the first and second embodiments will be described in more detail with reference to FIG. 2.

Figure 2:
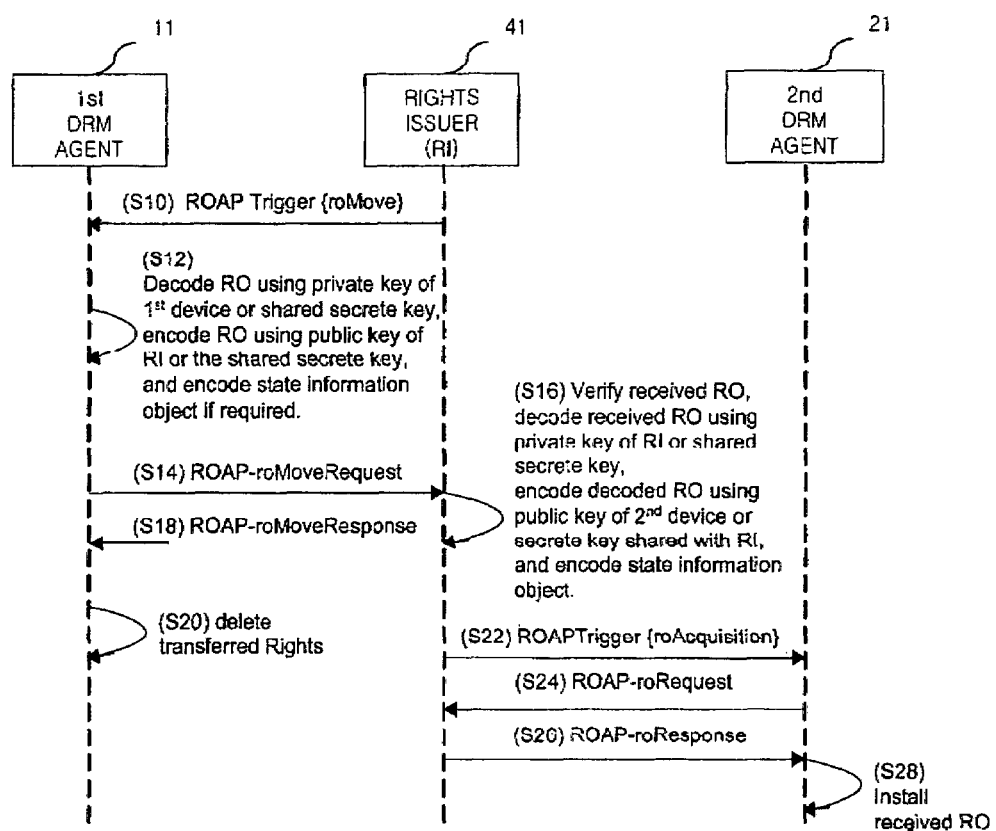
FIG. 2 illustrates an embodiment of a method for moving a rights object from one device to another device via a server in accordance with the present invention.

FIG. 2 illustrates an exemplary method for moving a rights object from one device to another device via a server in accordance with the first embodiment of the present invention. The first embodiment will be described based upon a signal flow shown in FIG. 2. The second embodiment will be described only by focusing on the difference from the first embodiment.

A first DRM agent is provided in the first device 10, and a second DRM agent 21 is provided in the second device 20. The RI 41 is provided in the server 40. The first user of the first device 10 may be the same as the second user of the second device 20 or be different therefrom. Also, an RO to be transferred may be a device RO or a user domain RO.

For the sake of explanation, an RO taken by the first device 10 is referred to as a first RO, an RO to be transferred from the first device 10 to the server 40 is referred to as a second RO, and an RO to be transferred from the server 40 to the second device 20 is referred to as a third RO.

The first RO has been issued to the first DRM agent 11 by the RI 41. The first RO may be an unused RO or remaining RO after being partially used.

Hereinafter, explanation is given to a case where the first DRM agent 11 transfers (moves) all or part of the first RO to the second DRM agent 21.

When intended to transfer an RO from one DRM agent to another DRM agent, namely, when transferring an RO via the RI, the RO should have a digital signature generated by the RI. Therefore, while requesting a moving (transferring) of the second RO converted from the first RO, the digital signature may provide the RI 41 with a integrity functionality and a non-repudiation functionality so as to allow the RI 41 to check whether the RO has been issued by itself.

First, the first user of the first DRM agent 11 browses an RI portal and selects a move service for moving (transferring) the RO to another DRM agent. The first user then requests a service from the RI 41, the service for transferring the first RO taken by himself to the second DRM agent.

The RI 41 sends an ROAP trigger (RO move trigger) to the first DRM agent in order to instruct the start of an RO transfer to the RI 41 (S10).

If the first DRM agent 11 has known an identifier of a target DRM agent (e.g., the second DRM agent 21), the step S10 may not be performed. The identifier of the second DRM agent denotes an ID of the second device.

Upon the reception of the ROAP trigger or a user initiation, the first DRM agent 11 generates a protected RO (i.e., the second RO) to transfer to the RI 41.

That is, the first DRM agent 11 decodes the RO issued by the RI 41 (i.e., the RO taken by the first DRM agent 11, namely, the first RO) using a private key of the first device or a secret key previously shared with the RI 41. Here, Rights Encryption Key (REK) and MAC key of the first RO are decoded.

The first DRM agent 11 generates another protected RO (i.e., the second RO). The another protected RO may also include content encryption key (CEK), permissions, constraints, and a digital signature all of which are the same as those included in the RO taken by the first device 10 (i.e., the first RO).

While the protected RO (i.e., the second RO) is being generated, the first DRM agent 11 encodes the REK and the MAC key using a public key of the RI 41 or a secret key previously shared with the RI 41, so as to allow the RI 41 to read out the REK and the MAC key. The first DRM agent 11 also generates a mac value to be used for integrity verification of the second RO so as to allow the RI 41 to verify the integrity of the second RO.

Assuming that the first RO is a stateful RO, if the first RO is entirely or partially transferred, the first DRM agent 11 generates a state information object from the managed state information (S12).

After generating the protected RO (i.e., the second RO), the first DRM agent 11 generates an RO move request message (e.g., ROAP-roMoveRequest) and sends it to the RI 41, the RO move request message including the generated RO, the state information object (if the RO is the stateful RO) and an identifier of the second device (Si 4) and digital signature of the message. The identifier of the second device may not be included. The first user may designate the identifier of the second device later at an RI portal. The RO move request message denotes a message for requesting a transfer (movement) of an RO to another DRM agent, which will be explained in detail later.

After successfully completing an authentication including a revocation status check using an digital signature in the ROAP request (e.g., ROAP-roMoveRequest) message sent from the first DRM agent 11, the RI 41 generates a protected RO bound to the second DRM agent (i.e., the third RO) (S16).

That is, the RI 41 verifies the received RO (i.e., the second RO), and decodes the received RO using a private key of the RI 41 (or a previously shared secret key), so as to generate an RO (i.e., the third RO) bound to the second device 20.

When generating the third RO (i.e., the RO bound to the second DRM agent), if receiving the state information object, the RI 41 should combine the received state information object and constraint information and should also modify the constraint values included in the second RO received from the first device (sending device) 10.

In addition, if a <move> element included in the received second RO has a count constraint, the RI 41 should decrease the value of <count> element having the <move> element by 1.

After modifying the constraint values included in a <rights> element in the received second RO, the RI 41 generates a digital signature value with respect to the <rights> element.

The RI 41 encodes a Rights Encryption Key (REK) and a MAC key using the public key of a target device (i.e., the second device 20) or the secret key previously shared with the second device 20, and then attaches the encoded wrapped REK and MAC key to a <encKey> element positioned blow a <ro> element.

The RI 41 generates a mac value for the <ro> element and attaches the generated mac value to a <mac> element positioned below a <protected RO> element. In such manner, the RI 41 generates the RO for the second DRM agent 21 (i.e., the third RO or the RO bound to the second DRM agent 21).

The RI 41 then sends an RO move response message (e.g., ROAP-roMoveResponse) to the first DRM agent 11 in response to the RO move request message (e.g., ROAP-roMoveRequest) (S18). The RO move response message expresses if the RI 41 assures the transferred second RO wilt be successfully delivered. The RO move response message will be explained in detail later.

After recognizing that the RO has successfully been transferred to the RI 41, the first DRM agent 11 which received the RO move response message deletes the corresponding RO (i.e., the first RO) in the first embodiment (i.e., for transferring the RO entirely) (S20), whereas modifying the state information related to the corresponding RO (i.e., the first RO) in the second embodiment (i.e., for transferring the RO partially).

The RI 41, on the other hand, conducts a typical 1-pass or 2-pass RO acquisition protocol (S22, S24 and S26). In case of 2-pass RO, the RI 41 sends an ROAP trigger to the second DRM agent 21 in order to instruct the second DRM agent 21 to download the RO transferred from the first DRM agent 11.

The second DRM agent 21 downloads the RO sent to the RI 41 by the first user of the first DRM agent 11 after the successful completion of the acquisition protocol procedure with the RI 41. The second DRM agent 21 accordingly installs the downloaded RO (S28).

Detailed explanation will now be given to the RO move trigger, RO move request message and the RO move response message proposed in the present invention.

The RO move trigger is first described herebelow.

The RO move trigger denotes an ROAP trigger sent from the RI to the sending device when the sending device desires to transfer (move) an RO to a receiving device via the RI. The RO move trigger may be one of extensions of a DRM ROAP trigger.

The RO move trigger, as shown at the step S10 of FIG. 2, is sent from the RI 41 to the first DRM agent 11 so as to indicate the first DRM agent 11 to start transferring the RO to the RI 41.

FIG. 3 illustrates an exemplary text describing a syntax of an RO movement trigger in accordance with the present invention. The underlined parts in FIG. 3 particularly indicate text-extended parts.

When the first DRM agent 11 receives an ROAP trigger which comprises a <roapTrigger> element having a <roMove> element, the first DRM agent 11 should acquire the first user's permission and initiate an ROAP-RO move request protocol. If the first DRM agent does not have an RI Context for the specified <riID> in the received RO move trigger, the first DRM agent 11 should initiate an ROAP-device hello registration protocol using a <roapURL> element in the RO move trigger.

When the first user selects one or more RO to be transferred, the RI 41 can designate a <roID> element(s) in the RO move trigger.

After receiving the <roID> element designated by the RI 41 through the RO move trigger, the first DRM agent 11 should include (add) the ROs or roIDs (Identifiers of ROs) to be transferred in the ROAP-RO move request message (i.e., ROAP-roMoveRequest).

If the first user who desires to transfer its RO to another device designates a target device, the RI 41 should set <targetDevice ID> element in <roap Trigger> element. Therefore, the <roap Trigger> element included in the RO move trigger can have the <targetDevice ID> element. The <targetDevice ID> element may include an ID value of the device (i.e., the target device) to which the RO is to be transferred.

The RO move request message is described hereafter.

The RO move request message (i.e., ROAP-RO move request message) is sent from the sending device to the RI 41 in order to initiate a move protocol by the RI. The message indicates that an RO is to be transferred to a target DRM agent via the RI. Referring to FIG. 2, the RO move request message is sent from the first DRM agent 11 to the RI 41 at the step S14.

FIG. 4 illustrates parameters of an RO move request message in accordance with the present invention. In FIG. 4, "M" denotes mandatory component, and "o" is an optional component.

A device ID denotes a requesting device, namely, a sending device. RI ID denotes an ID of a server, namely, the RI.

Trigger nonce is the same as a nonce value included in the RO move trigger received from the RI 41. Upon specifying (defining) the trigger nonce parameter, the RI 41 may store an ID of a target device (i.e. the ID of the second device) which the first user has designated during browsing. In this case, the target device ID parameter may not be required to be specified (defined) in the RO move request message.

Device nonce denotes a nonce selected by the sending device (i.e., the first device).

Request time denotes a current DRM time recognized by the sending device.

The target device ID should be specified if the RO move trigger received from the RI has the <targetDevice ID>. The target device ID value should be the same as the <targetDevice ID> element in the RO move trigger. If the target device ID parameter is not specified, the first user should designate the target is device at the RI portal.

ROInfo(s) parameters denote one or more ROs to be moved (transferred). It can contain one or more pair of ROID and state information object, or one or more protected RO and state information object.

Contents of the protected RO should be the same as those of the RO which was initially received from the RI except for <encKey> element included in <ro> element of <protected RO> element and <mac> element included in the <protected RO> element.

The <encKey> element has a wrapped Rights Encryption Key (REK) and a MAC key. The two keys should be encoded by the first device using a public key of the RI or the secret key previously shared with the RI, the public key having previously been shared in an inter-certification process.

The <mac> element includes a mac value for the <protected RO> element. The mac value should be calculated using the MAC key in the <encKey> element or calculated using a newly-generated MAC key, and attached into the <mac> element.

A state information object(s) parameter should be included in the RO move request message when the RO is a stateful RO. The state information object(s) parameter indicates state information managed by the first DRM agent of the first device.

When transferring (moving) a specific RO entirely, the state information object is generated from state information corresponding to all of the specific RO. Conversely, when transferring a specific RO partially, the state information object is generated from state information corresponding to part of the specific RO.

A certificate chain parameter is included in the RO move request message if the RI context does not indicate that the RI has stored its required device certificate information.

A extensions parameter may include a redirect identifier extension. When the redirect identifier extension exists in an extensions parameter field, the extensions parameter indicates an ID of a receiving device (e.g., the second device) to receive a protected RO. The ID may be a phone number defined by cellular operators for each device. If the redirect identifier extension does not exist, it implicitly indicates to the RI that the first device is submitting the unused RO for a new RO having the equal value or lesser value smaller (here, the unused RO corresponds to the protected RO parameter). That is, if the redirect identifier extension does not exist in the extensions parameter field of the RO move request message, the RI which received the RO move request message recognizes that the RO included in the RO move request message (i.e., the RO corresponding to the protected RO field) is to be issued by being converted into another RO.

A signature parameter denotes a digital signature for the RO move request message.

FIG. 5 illustrates an exemplary syntax of an RO move request message in accordance with the present invention. In FIG. 5, a <roMoveRequest> element defines an ROAP-RO move request message, and has complex type "roap:ROMove Request". The "roap:ROMove Request" type extends the basic "roap:Request type" function.

FIG. 6 illustrates a schema fragment of a redirect identifier extension parameter included in an RO move request message in accordance with the present invention.

An RO move response message is described hereafter.

The RO move response message (i.e., ROAP-ROMove response) is sent from the RI to the sending device in response to the RO move request message (i.e., ROAP-ROmove request), namely, a message sent from the RI 41 to the first DRM agent 11 at the step S18 of FIG. 2. The RO move response message indicates whether the RI assures that the RI is to be successfully delivered (transferred).

FIG. 7 illustrates an exemplary syntax of an RO move request message in accordance with the present invention.

A status parameter denotes a processed state of the RO move request message by the RI. The status parameter has a "success" value if the processing is succeeded. Otherwise, the RI selects one of status messages indicating errors.

A device ID parameter denotes an ID of a device receiving the RO move response message. This parameter has the same value as the value of the device ID parameter included in the RO move request message (i.e., the value of the device ID parameter of FIG. 4).

An RI ID parameter denotes an ID of an RI which sends the RO move response message. An RI nonce parameter has a nonce selected by the RI.

The ROURI parameter denotes an address (e.g., HTTP URL) for obtaining an RO bound to a target device. A device can deliver the RO URI to the target device in order to allow the target device to download the RO.

An extensions parameter is defined for the RO move response message, but it is not used herein.

A signature parameter denotes a digital signature for the RO move response message.

FIG. 8 illustrates an exemplary text indicating a syntax of an RO move request message in accordance with the present invention.

<roMoveResponse> element defines an ROAP-ROMoveResponse message.

The <roMoveResponse> element has a "roap:ROMoveResponse" complex type. This complex type extends the basic "roap:Response" type.

Hereinafter, a digital signature included in an RO issued by the RI is described.

When an RO is intended to be transferred from one DRM agent to another DRM agent, the RI issues the RO having a digital signature regardless of the RO being transferred via the RI or directly transferred. While the RO move request is processed, the digital signature can provide the RI with non-repudiation functionality in order for the RI to check whether the RI has been issued by the RI itself.

Referring to FIG. 2, while the first device 10 receives the RO issued by the RI 41 and installs it, if "move" permission is defined in <rights> element, the first DRM agent 11 of the first device 10 should store the value of <signature> element (here, the value of the <signature> element is generated by the RI if the RO includes the "move" permission). The first DRM agent 11 should be able to create the same <rights> element as the <rights> element included in the RO initially issued by the RI 41.

Also, the first DRM agent 11 should store the REK and MAC key included in the initially-issued RO.

FIG. 9 illustrates an exemplary XML document indicating "move" permission included in an RO.

A <type> element positioned below a <move> element may have a value(s) of "via RI" and/or "directly". If the value of the <type> element is "via RI", the first DRM agent 11 can move the RO via the RI 41. If the value of the <type> element is "directly", the first DRM agent 11 can move the RO directly to another DRM agent (here, detailed description of the direct transfer of RO may not be considered in the present invention).

A <count> element under <constraint> element indicates the number of times to transfer the RO.

If the value of the <count> element is "0", the first DRM agent 11 should not send the RO move request message with respect to the RO to the RI 41.

Processing operations performed when the first DRM agent 11 installs the RO to be transferred, the RO initially issued by the RI 41, may equally be applied when the second DRM agent 21 of the second device 20 installs the received RO.

In another embodiment of the present invention, a method for transferring a rights object between devices via a server will be described. In the another embodiment, a sending device sends an RO identifier other than the RO itself to the server in order to request an RO move. That is, the another embodiment is different from the above-described first and second embodiments in that the sending device sends to the server not the RO but the RO identifier.

Referring to FIGS. 1 and 2, description will be given to a case of transferring an RO of the first device 10 to the second device 20 via the server 40, i.e., the RI 41.

If the RI 41 has stored the RO of the first device 10, both the first device 10 and the RI 41 can identify the RO based on an RO identifier.

The first device 10 sends an RO move request message including an RO identifier for identifying the RO to the RI 41 in order to request the RI 41 to transfer its RO to the second device 20. Here, the RO move request message may not include the protected RO(s) parameter shown in FIG. 4 as an mandatory components, but rather include the RO identifier as the mandatory component.

The RI 41 then checks the RO corresponding to the RO identifier included in the received RO move request message. The RI 41 decodes the checked RO using its private key or a secret key previously shared with the first device 10. Afterwards, the RI 41 encodes the decoded RO using a public key of the second device 20 or a secret key previously shared with the second device 20.

When encoding the RO, the RI 41 decreases the number of transferring times by 1 time if the decoded RO has a move count constraint. The RI 41 also encodes a REK and a MAC key included in the decoded RO using the public key of the second device 20 or the secret key previously shared with the second device 20. The RI 41 generates a mac value by calculating the MAC key or a newly-generated MAC key.

If the RO is a stateful RO, the RI 41 may encodes a state information object.

As such, after generating the RO to be moved to the second device 20 or during the RO generation, the RI 41 sends a response message (e.g., an RO move response message) to the first device 10 in response to the RO move request message. If the response message indicates a guarantee of a successful transfer of the RO, the first device 10 deletes the RO for the transfer of an entire RO, and modifies state information related to the RO for the transfer of a partial RO.

The RI 41 transfers both the encoded Ro and the state information object (in case of the stateful RO) to the second device 20. The second device 20 accordingly receives the RO for installation.

As described thus far, as the present invention provides the method for transferring (moving) all or part of an RO taken by a specific device to another device via a server, the RO for a specific content issued by the server can be transferred to the another device via the server.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A method for transferring a rights object (RO) issued by a server between devices via the server comprising:
   receiving, by a sending device and from the server, a trigger message;
   checking, by the sending device, the trigger message;
   generating, by the sending device, a rights object move request message;
   wherein the rights object move request message includes an identifier of the RO,
   wherein the rights object move request message selectively includes one or more rights,
   wherein the selectivity is based on whether or not the server keeps the record of the RO,
   wherein, according to the selectivity only when the checking step determines that the server does not keep the RO, the rights object move request message includes the one or more rights including at least one or more encrypted keys, and
   wherein, when the one or more rights are included in the right object move request message, a signature of the server is also included, the signature indicating that the signature was created by the server;
   sending from the sending device to the server the rights object move request message for requesting a transfer of the RO to a receiving device via the server;
   receiving a response message from the server with respect to the rights object move request message; and
   deleting the RO or modifying state information related to the RO.

2. The method of claim 1, wherein the step of generating the rights object move request message comprises:
   generating the one or more rights using a public key of the server or a secret key shared with the server.

3. The method of claim 1, wherein the at least one or more encrypted keys includes a Rights Object Encryption Key (REK) and a MAC key.

4. The method of claim 1, wherein the rights object move request message further includes at least one or more of an ID of the sending device, an ID of the server, a device nonce, a request time, a trigger nonce, an ID of the receiving device, and a certificate chain.

5. The method of claim 1, wherein the response message includes at least one or more of:
   a status of processing the rights object move request message, an ID of a device to receive the response message, a server ID, a server nonce and a digital signature for the response message, and includes, as optional parameters, a URI parameter for acquiring a RO bound to the receiving device, and an extensions parameter.

6. The method of claim 1,
   wherein, when all of the RO is transferred to the receiving device via the server, the sending device deletes the RO, and
   wherein, when only a subset of the RO is transferred to the receiving device via the server, the sending device modifies state information related to the RO.

7. The method of claim 1, wherein when the one or more rights are stateful, state information is included in the one or more rights.

8. The method of claim 1, wherein the RO corresponds to one of a device rights object and a user domain rights object.

9. The method of claim 1, wherein the one or more rights have at least move constraint.

10. A method for transferring a rights object (RO) between devices via a server comprising:
    transmitting, by the server and to a sending device, a trigger message;
    receiving, by the server and from the sending device, a rights object move request message for requesting a transfer of the RO to a receiving device via the server, the RO having been issued from the server to the sending device;
    wherein the rights object move request message includes an identifier of the RO,
    wherein the rights object move request message selectively includes one or more rights,
    wherein the selectivity is based on whether or not the server keeps the record of the RO,
    wherein, according to the selectivity only when the server does not keep the RO, the rights object move request message includes one or more rights including at least one or more encrypted keys, and
    wherein, when the one or more rights are included in the right object move request message, a signature of the server is also included, the signature indicating that the signature was created by the server;
    performing a verification of the signature;
    sending, by the server, a response message to the sending device with respect to the rights object move request message;
    generating the RO for transfer to the receiving device based on the rights object move request message; and
    transferring the generated RO to the receiving device.

11. The method of claim 10, wherein the step of generating the RO comprises:
    decrypting the encrypted keys using a private key of the server or a secret key shared with the sending device; and
    encrypting the decrypted keys using a public key of the receiving device or a secret key previously shared with the receiving device.

12. The method of claim 10, wherein the step of generating the RO comprises:
    setting a move count constraint value included in the RO based on the state information.

13. The method of claim 10, wherein the rights object move request message further includes at least one or more of an ID of the sending device, an ID of the server, a device nonce, a request time a trigger nonce, an ID of the receiving device, a certificate chain, and an extensions parameter.

14. The method of claim 10, wherein the response message includes at least one or more of:
    a processed state of the rights object move request message, an ID of a device to receive the response message, an ID of the server, a nonce, a digital signature for the response message, and a URI parameter.

15. The method of claim 10, wherein the step of generating the RO comprises at least one of:
    generating a digital signature value;
    encoding a Rights Encryption Key (REK) and a MAC key using a public key of the receiving device or a secret key previously shared with the receiving device; and
    generating a mac value.

16. The method of claim 15, wherein the encrypted keys include
    a Rights Object Encryption Key (REK) and a MAC key which are encrypted by the sending device using a public key of the server or a secret key shared with the server.

17. The method of claim 10, wherein when the one or more rights are stateful, state information is included in the one or more rights.

18. The method of claim 10, wherein the RO is transferred from the server to the receiving device and installed in the receiving device.

19. A sending device in an apparatus for transferring a rights object (RO) between devices comprising:
    a Digital Rights Management (DRM) agent which receives from a server a trigger message, checks the trigger message and generates a rights object move request message for requesting a transfer of the RO,
    wherein the rights object move request message includes an identifier of the RO,
    wherein the rights object move request message selectively includes one or more rights,
    wherein the selectivity is based on whether or not the server keeps the record of the RO,
    wherein, according to the selectivity only when the DRM agent determines the server does not keep the RO, the rights object move request message includes one or more rights including at least one or more encrypted keys,
    wherein, when the one or more rights are included in the rights object move request message, the rights object move request message includes a signature of the server indicating that the signature was created by the server is, and
    wherein the DRM agent further sends to the server the rights object move request message to a receiving device via the server, receives a response message from the server with respect to the rights object move request message, and deletes the RO or modifies state information related to the RO.

20. The sending device of claim 19, wherein the one or more encrypted keys comprise a Contents Encryption Key (CEK) encoded using a public key of the server or a secret key shared with the server.

21. The sending device of claim 20, wherein the one or more rights comprise permissions and constraints for the contents.

22. The sending device of claim 21, wherein the one or more encrypted keys comprise a Rights Encryption Key (REK) and a MAC key each encoded using a public key of the server or a secret key previously shared with the server.

23. The sending device of claim 22, wherein the rights object move request message comprises a mac value generated by calculating the MAC key or a new MAC key.

24. The sending device of claim 19, wherein the rights object move request message is a message for requesting the server to transfer the rights object to the receiving device via the server.

25. The sending device of claim 19, wherein the rights object move request message further includes at least one or more of:
 an ID of the sending device, an ID of the server, a device nonce, a request time, a trigger nonce, an ID of the receiving device and a certificate chain.

26. A server in an apparatus for transferring a rights object (RO) between devices comprising:
 a communication module which communicates with a sending device and a receiving device; and
 a Rights Issuer (RI) for cooperating with the communication module thereby to perform steps of:
 transmitting a trigger message to the sending device;
 receiving, from the sending device, a rights object move request message for requesting a transfer of the RO, which was issued from the server to the sending device, to the receiving device via the server;
 wherein the rights object move request message includes an identifier of the RO,
 wherein the rights object move request message selectively includes one or more rights,
 wherein the selectivity is based on whether or not the server keeps the record of the RO,
 wherein, according to the selectivity only when the server does not keep the record of the RO, the rights object move request message includes one or more rights including at least one or more encrypted keys, and
 wherein, when the one or more rights are included in the rights object move request message, the rights object move request message includes a signature of the server indicating that the signature was created by the server is also included;
 performing a verification of the signature;
 sending a response message to the sending device with respect to the rights object move request message;
 generating the RO to be transferred to the receiving device based on the rights object move request message; and
 transferring the generated RO to the receiving device.

27. The server of claim 26, wherein the rights issuer decrypts the encrypted key included in the rights object move request message using a private key or a secret key previously shared with the sending device, and encrypts the decrypted key using a public key of the receiving device or a secret key previously shared with the receiving device.

28. The server of claim 26, wherein the rights issuer modifies a move count constraint value when the one or more rights included in the rights object move request message has the move count constraint.

29. The server of claim 26, wherein the rights object move request message further includes at least one or more of:
 an ID of the sending device, an ID of a rights issuer, a device nonce, a request time, a trigger nonce, an ID of the receiving device and a certificate chain.

30. The server of claim 26, wherein the response message includes at least one or more of:
 a processed state of the rights object move request message, an ID of a device to receive the response message, a server ID, a server nonce and a digital signature for the response message, and a URI parameter.

* * * * *